Jan. 19, 1965 W. F. HUCK 3,165,954
APPARATUS FOR TRIMMING SHEETED MATERIAL
Filed Oct. 14, 1960 7 Sheets-Sheet 1

Fig.1

INVENTOR
WILLIAM F. HUCK
BY
ATTORNEY

Fig. 3

Jan. 19, 1965   W. F. HUCK   3,165,954
APPARATUS FOR TRIMMING SHEETED MATERIAL
Filed Oct. 14, 1960   7 Sheets-Sheet 6

INVENTOR
WILLIAM F. HUCK
BY
ATTORNEY

INVENTOR
WILLIAM F. HUCK
BY
ATTORNEY

_United States Patent Office_ 3,165,954
Patented Jan. 19, 1965

3,165,954
APPARATUS FOR TRIMMING SHEETED
MATERIAL
William F. Huck, 81 Greenway Terrace,
Forest Hills, N.Y.
Filed Oct. 14, 1960, Ser. No. 62,712
27 Claims. (Cl. 83—139)

This invention relates to new methods and new apparatus for trimming sheeted materials and, more particularly, to methods and apparatus for trimming multi-sheeted flexible materials which are produced in pieces having rough or irregular edges, such, for example, as the collection of folded printed sheets known as "signatures" which are assembled into magazines, books and similiar printed and folded products.

In the production of magazines and books by web-fed printing presses the paper is unwound from one or more web supply rolls and then printed, slit into ribbons of standard page width and subsequently collated. The collated ribbons are then cut to the desired length and folded into groups or pieces known as signatures, which are subsequently stapled or bound and delivered as rough magazines or books.

Except for their one folded edge, the signatures have uneven edges. Some of the unevenness is caused by inaccuracies in the sidewise location of the ribbons during collating, and some by the fast but comparatively inaccurate ribbon cutting mechanisms employed in high speed web-fed presses. In addition, there is always inaccuracy at the edges opposite to the folds in multi-sheeted products such as signatures, for these edges tend to fan out as an unavoidable result of the folding of pre-cut collated ribbon sections of approximately the same width. After the folding operation the inside pages of each folded piece extend farther from the folded edge thereof than the outside pages. This condition detracts from the appearance and other desired qualities of the printed and folded products. Newspapers with their jagged, fanned edges are an example of printed products afflicted with this condition.

Although fanned out and misaligned page edges are tolerated in newspapers, they are not accepted for book type publications. For this reason, such high quality products when delivered from the printing press are stacked upon skids and then transported to other locations where they are unloaded again, jogged in stacks about 6 inches high and placed upon the anvils of semi-automatic trimming machines, all by manual labor. These trimming machines then clamp the stacks of untrimmed products, trim the parallel sides and then the edge opposite the folded edge, and subsequently unclamp the trimmed stacks, after which the products are manually removed and stored ready for shipment. While the trimming operation is done semi-automatically and at a good production rate because of the large number of copies in each stack, it nevertheless requires costly manual handling, transporting, storing, feeding and removal of copies after they have been trimmed.

It is an object of this invention to provide methods and apparatus by which the trimming of sheeted materials in piece form, and especially of pieces of multi-sheeted flexible material, such as signatures, may be carried out successfully in a continuous manner and at high production speeds, without need for manual handling of the materials.

Another important object of the invention is to provide apparatus which will attach to a printing press and operate in unison with it to receive printed and folded pieces from the printing press delivery mechanism and automatically, in one continuous pass, trim the three unfolded edges of the pieces and then continuously deliver them to a suitable collector for subsequent movement to a shipping point.

It will be understood that an apparatus of this nature enables the elimination of all manual handling, transporting and storing before the products are finished. While the desirability of such an achievement is obvious, the means required for accomplishing this trimming or cutting of edges of printed products at the very high speeds used in present day presses have not been available prior to the present invention.

It is a further object of the invention to provide trimming methods and apparatus which are capable of producing the desired smoothness of trimming cut and clean cut edges on every piece to be trimmed while the pieces, even though multi-sheeted as in the case of signatures, are being carried at high speed through a trimming path.

According to this invention, the trimming is carried out by locating each piece to be trimmed in face-to-face relation to a support surface and, while holding it firmly in that relation and carrying it on the support surface through a trimming path, trimming the piece transversely, such as along its trailing edge to cut a rough or irregular end portion from it, by moving a knife through it in a cutting plane transverse to the trimming path. In order to provide a desired speed and smoothness of cutting, the trimming is effected with shear action by movement of the knife edge relative to the piece in a two-directional path lying in the cutting plane.

In order to trim either or both of the side edges of the piece, the same piece carried on the support surface is trimmed longitudinally, such as along either or both of its side edges, in another zone of the trimming path by movement of another knife or knives through it in a plane or planes parallel to that path. This trimming is also effected with speed and smoothness by movement of each knife edge relative to the piece in a two-directional path lying in the cutting plane, so that the knife cuts with shear action.

According to another feature of the invention, which is especially important for the processing of multi-sheeted flexible pieces such as signatures, each piece to be trimmed is carried on a straight-convex support surface, so that the piece takes the curvature of that surface, and an end portion is trimmed from the piece by moving a knife through it in a cutting plane lying transverse to the trimming path but sloped forwardly in the direction of movement of the piece at an angle to the radii of the support surface located at the intersection of the cutting plane with that surface. In this way, the transverse cutting knife forms on the piece a tapered trimmed edge that becomes substantially square when the trimmed piece is laid flat.

The invention provides apparatus embodying numerous new features of arrangement, construction and operation for carrying out the trimming in the desired manner.

According to an important embodiment, such an apparatus is provided which when trimming pieces of multi-sheeted flexible material, such as signatures, applies compressive forces to hold the leaves of each piece firmly together and in smooth face-to-face relation to the surface of a support member which forms a part of a suitable carrier, such as a rotary cylinder moving the pieces successively through a fixed trimming path, and sharp knives located parallel to the rough edges of the piece are forced through the paper with shear action, whereby the knives and the material held on the support member are caused to slide relatively to each other in a direction parallel to their lines of contact to produce the desired clean cut edges. To sustain the cuts and protect the cutting edges of the knives, each support member, of which several may be provided on a rotary cylinder, has portions of its surface formed by anvil cutting blocks. These blocks are made of a relatively soft, cut-resistant material against which the knives will cut cleanly through every sheet of paper comprising the signature.

For coaction with a carrier cylinder of the type mentioned, a plurality of other rotary cylinders are spaced about the periphery of that cylinder on fixed axes parallel to its axis and are driven synchronously with it. One of the other cylinders is a transverse cutting cylinder carrying a knife to trim transversely each piece carried on each support member of the central cylinder. Another of them is a cylinder carrying knives to cut each piece longitudinally. Another of them serves to feed the pieces to be trimmed one after another to the support members of the central cylinder; and still another serves to grip the trimmed pieces and discharge them from the central cylinder. The several cylinders together may be driven at a speed corresponding to that of a high-speed printing press of the most advanced construction. A rotary trimmer is thus provided with will give at very high operating speeds trimmed products equal or superior in quality to those obtained heretofore by the use of stationary, semi-automatic trimmers.

For the processing of the signatures delivered from an associated printing press, the feeding cylinder of the trimmer may be arranged to receive the pieces directly from the delivery mechanism of the press, such as from an endless belt conveyor delivering them one after another at high speed. The feeding cylinder then may carry cam-operated grippers associated with rigid abutments and operated in timed relation to the press so as to assure accurate alignment of the folded edges of each piece against a set of locating abutments as the signatures are delivered from the press.

The central cylinder carrying the support or anvil members also is provided with suitable gripping means, such as a set of cam-operated grippers at the leading edge of each support member, for receiving and holding to those members the pieces transferred to them from the feeding cylinder. These grippers also have abutment means assuring accurate location of the pieces on the support members.

Pneumatic pressure means are provided along a part of the path of the central cylinder to hold the body of each piece on the latter against the surface supporting it while the central cylinder carries the piece into a cutting zone.

The transverse cutting cylinder carries a plurality of straight cutting knives lying parallel to its axis, to trim the trailing edges of the successive pieces carried through the zone of action of these knives by a kind of diagonal shear cutting against end portions of the support members on the central cylinder. Each of these knives acts in that zone by movement in a two-directional path within its cutting plane, for which purpose suitable operating means actuated by the rotation of the transverse cutting cylinder are provided for each knife.

The transverse cutting cylinder also carries ahead of each knife thereon flexible means, such as a compressible elastic bearer, for pressing the body of each piece being trimmed smoothly and firmly against the surface of the support member carrying it, so that the piece is prevented from shifting during the transverse trimming operation.

The longitudinal cutting cylinder carries a plurality of arcuate or curved cutting knives which serve to trim with shear action the side edges of each piece carried on the support members through the zone of their action. In that zone additional flexible means are provided for pressing and holding the body of each piece firmly in smooth face-to-face relation to the support member carrying the piece; such, for example, as a plurality of flexible belts having a flight thereof tensioned against a peripheral portion of the central cylinder between the latter and the longitudinal or side edge trimming cylinder.

The central cylinder is also provided with internal passages which are open at its periphery through slots lying lever 18 keyed to a shaft 19 mounted for rotation in the cylinder. Pivoting motion is imparted to each shaft 19 adjacent to the side edges and the end edge of the support members, and suitable suction means connected with these passages serve to draw the trimmings cut from the pieces through the slots and to remove the trimmings from the apparatus, such as by pulling them through a journal of the central cylinder to outside chutes and letting them fall into a collecting funnel.

The delivery cylinder is provided to remove the trimmed pieces from the central cylinder and discharge them to a collector in "pile" arrangement. This cylinder includes slow-down or snubbing rollers for pressing the trimmed pieces against a mating roller so as to reduce their speed and allow them to drop onto the collector at a properly controlled speed and position.

The trimming methods and apparatus of this invention can of course be employed to cut the edges of single sheets as well as folded signatures. They are also capable of cutting the edges of a stack of folded signatures as well as single folded signatures. In other words, the invention is useful for the trimming of almost any product composed of thin or flexible sheet material, whether single sheeted or laminated.

Other objects, features and advantages of the invention and details of a preferred manner of practicing the invention will be apparent from the following description and the accompanying drawings of an illustrative embodiment thereof. In the drawings:

FIGS. 9A through 14A are corresponding side elevational views of end portions of the knife and the signature in the same six positions.

The trimming apparatus illustrated in the drawings can be attached to the delivery end of a printing press, consisting of a standard folding unit which cuts a continuous printed web into pages of equal length by means of counter rotating cylinders. The cut pages are individually transported to a rotating transfer cylinder which places them on a rotating collecting cylinder. The latter collects a number of the pages into a stack, after which the pages of each stack may be fastened together along their center by a rotating stitching cylinder and subsequently folded along the stitched line by a rotating folding cylinder. The means which perform such operations, being well known, are not shown. Each folded, stitched piece, known as a signature, is then deposited between transport belts 11 and 12 which deliver the piece to the present trimming apparatus.

In the trimming apparatus shown, a feeding cylinder T (FIGS. 2 and 4) receives the signatures S from transport belts 11 and 12 and transfers them by means of cam-actuated grippers G to a central carrier cylinder A.

Figure 2:
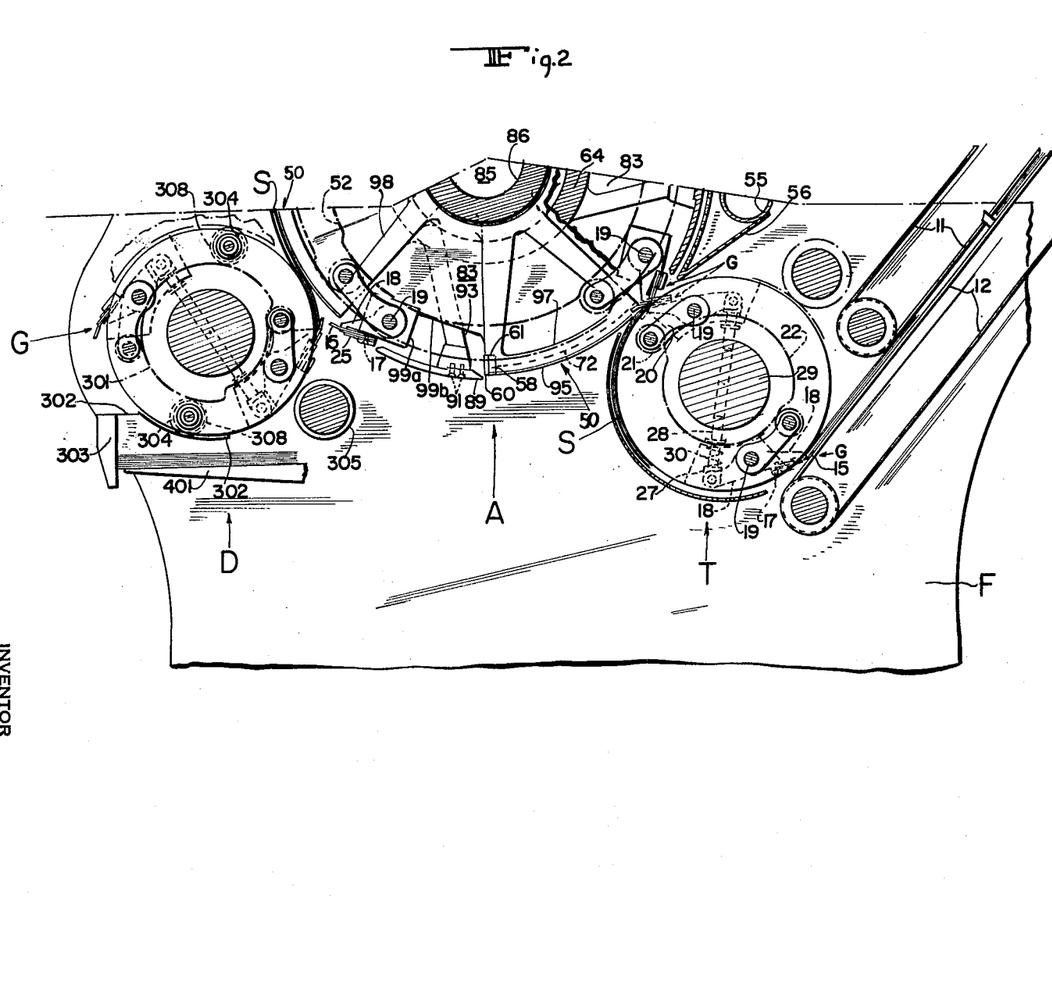
FIG. 2 is a vertical cross-section through the lower portion thereof.
Figure 4:
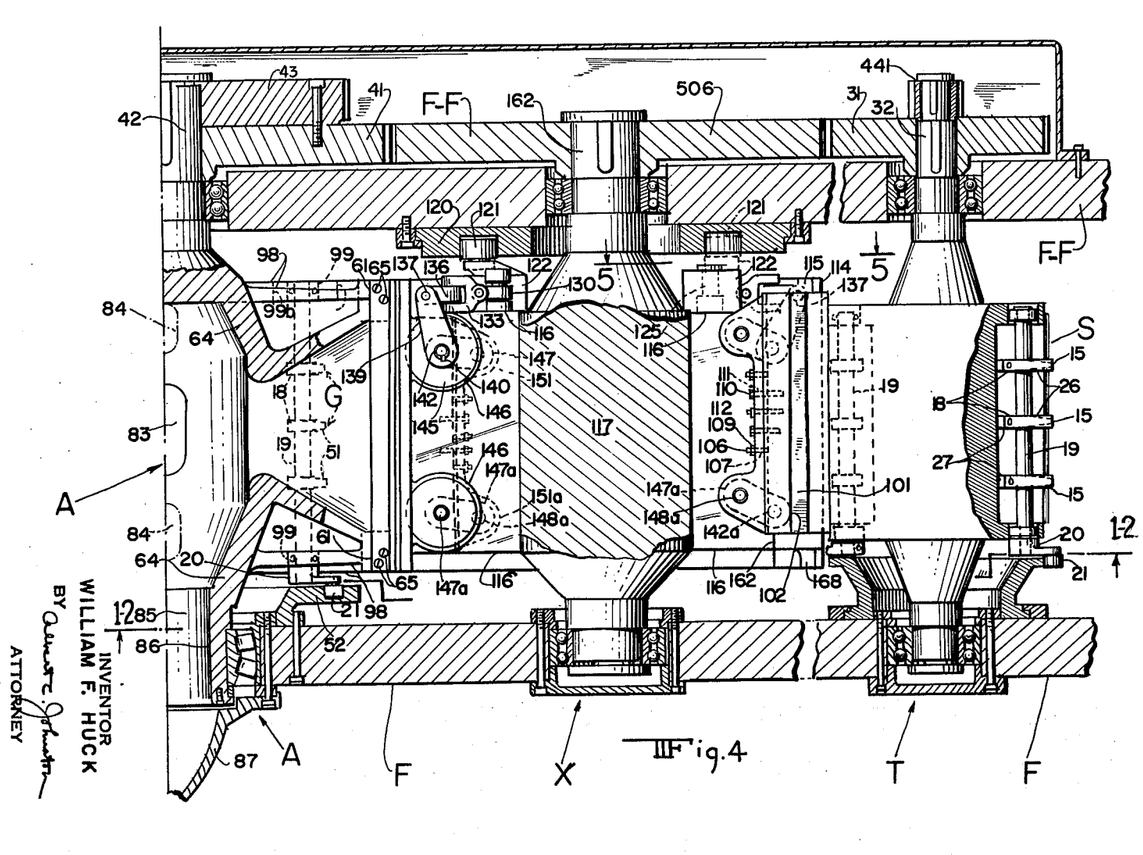
FIG. 4 is a horizontally developed view, partly in section, of the elements in a right hand portion thereof.

The grippers G each consist of a gripping blade 15 attached by means of a cap plate 16 and screw 17 to a by an arm 20 carrying a cam follower roller 21 which engages a stationary cam 22 secured to the inside of the front machine frame F. Leaf springs 25 are located above the gripping blades 15 to provide positive clamping force during engagement of blades 15 with signature S.

The forward end of each lever 18 has a blunt or squared abutment surface 26 located below the blade 15, which abutment serves to position accurately the folded edge of each signature S engaged by the gripper. The backward end of at least one of the levers 18 on a given shaft 19 has a pivot connection to a forked rod 27 capable of slidable movement in a hole 28 which passes radially through the center of the feeding cylinder body 29. A compression spring 30 on each rod 27 urges its follower roller 21 against the surface of cam 22 at all times. A sheet metal guide M retains the body of each signature S against the surface of cylinder T during the transfer of the signature from the transport belts 11 and 12 to the carrier cylinder.

Upon reaching the cylinder A, the folded leading edge of the signature S is accurately positioned against the abutments 26 of one of four sets of grippers G carried by that cylinder, and is retained by the related grippers in the desired location at the forward end of the surface of a support member 50 carried by cylinder A, through the actuation of the grippers by a stationary cam 52 secured to the inside of front machine frame F. The cam 52 (FIG. 4) is a grooved face cam receiving a follower roller 21 carried on an arm of the shaft 19 of each set of these grippers G. Thus, spring-pressed rods for holding the followers on the cam are omitted from the central cylinder, although such means could be used. The shafts 19 carrying the grippers G on cylinder A are rotatably mounted at their ends in anti-friction bearings 99 supported by bearing blocks 99a which are secured to webs 99b interconnecting adjacent outer spokes 98 of this cylinder.

The body of each signature S is held down against the surface of the support member carrying it on cylinder A, while passing between cylinder A and a transverse cutting cylinder X, by a pneumatic pressure system (FIGS. 1 and 2) consisting of a duct 55 and a chamber 56 having a perforated panel or face plate formed with a series of small orifices 57 for directing jets of air under pressure against the outer surface of the signature.

The central cylinder A carries a plurality of the support members 50, each of which forms a straight-convex surface to support a signature in face-to-face relation thereto with the signature conforming to the curvature of that surface. As shown, there are four such members uniformly spaced about the circumference of cylinder A.

Figure 3:
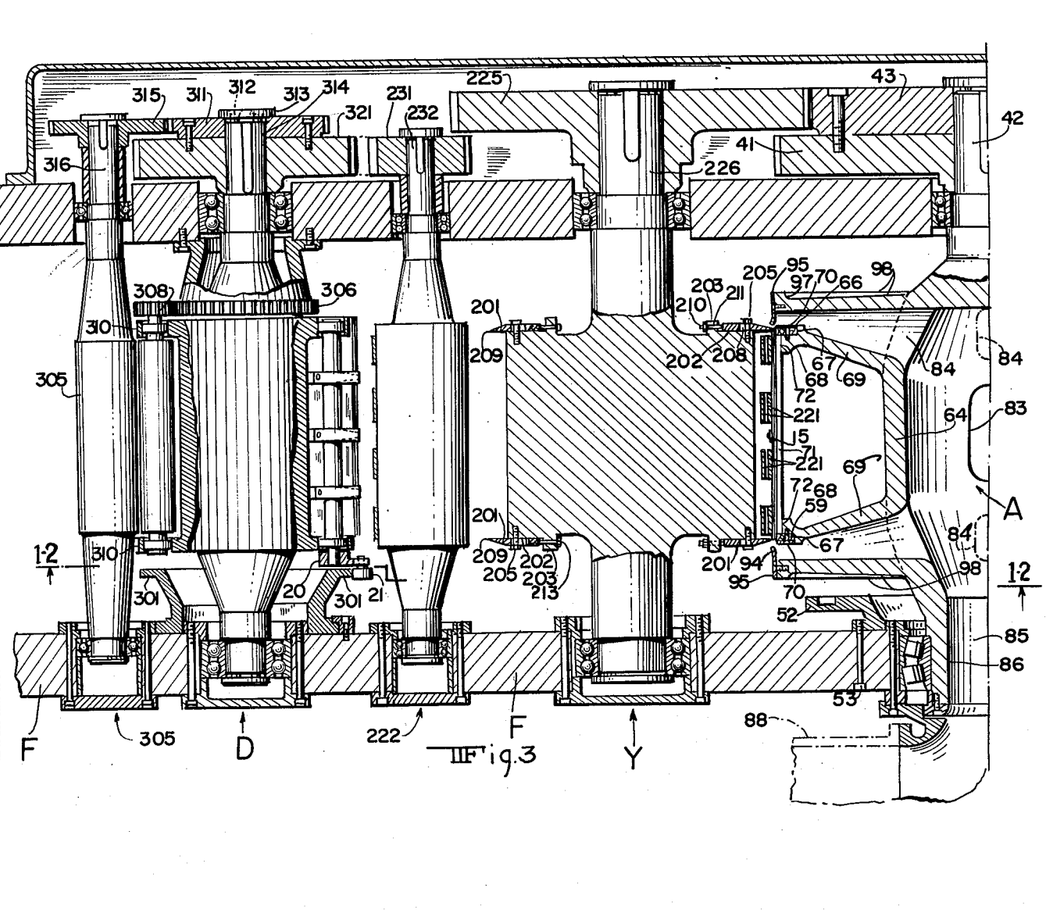
FIG. 3 is a horizontally developed view, partly in section, of the elements in a left hand portion thereof.

Each of the support members comprises a transverse or end portion 58 and two side portions 59 which are formed by anvil blocks of hardwood located in positions to coact with and sustain the cuts of knives acting in the path of these members to cut trailing and side edge portions from the signature to be trimmed. Each signature S is supported between the anvil blocks by a curved plate 71 secured to the top surface 72 of the flanges 68 (FIG. 3).

Each transverse anvil block 58 is fixed to a clamping plate 60 and rests on a rigid supporting surface 61 machined into the ends of spokes 63 which project radially from the carrier cylinder hub 64. The ends of each block 58 and plate 60 are fixed to the flanges 62 as by screws 65 (FIG. 4). Each of the side anvil blocks 59 (FIG. 3) is fixed to a clamping plate 66, forming a unit that rests on a chordal surface 67 (FIG. 1) machined into the side of flange 68 and is secured to that flange, as by screws 70. Each flange 68 is supported by a spoke 63 at one end, and at its other end by a spoke 69 projecting radially from cylinder hub 64.

The successive signatures S are held on the support members 50 by the grippers G, with their trailing edges lying substantially parallel to the axis of cylinder A, and the trailing edges are trimmed by the interaction of cylinder A with a transverse cutting cylinder X carrying shearing knives 101. There are four shearing knives 101 uniformly spaced apart on cylinder X.

Figure 1:
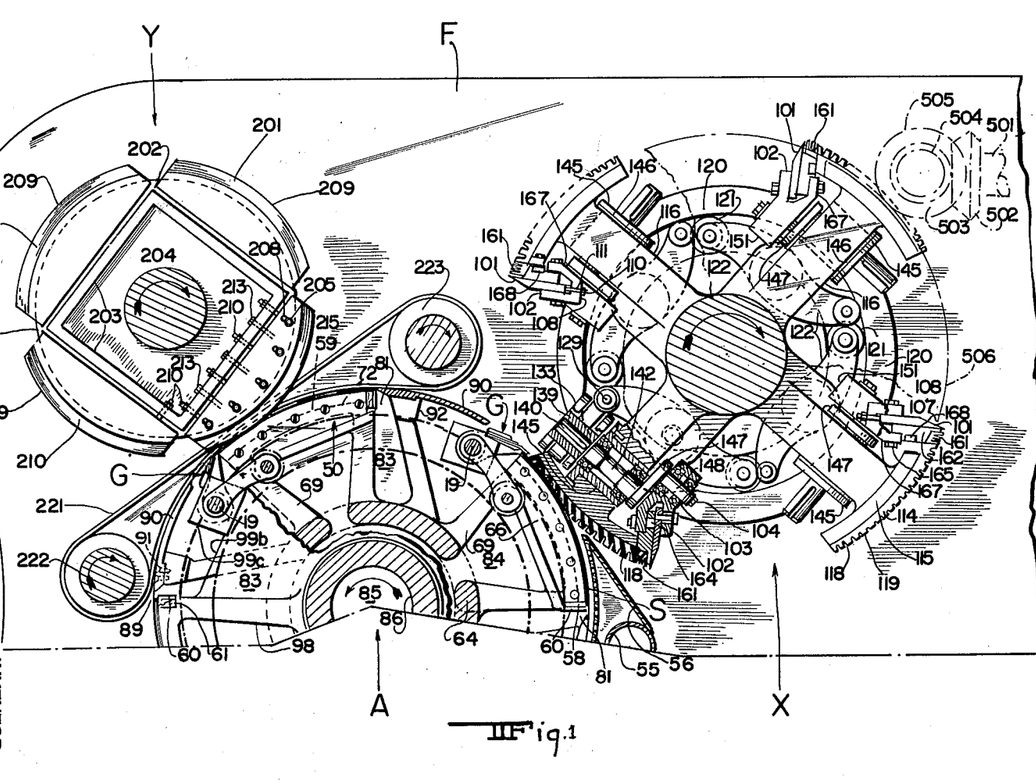
FIG. 1 is a vertical cross-section through an upper portion of a rotary trimmer embodying the invention.

As seen in FIG. 1, each knife 101 is attached to a clamping block 102 by bolts 103 passing through elongated slots 105 in the block 102. The radial position of each cutting knife 101 may be adjusted outwardly by means of set screws 106 (FIG. 4) which are threaded in holes 107 in a connecting rib 108 on the clamping block 102 and are securely located by locking nuts 109. The radial position of each cutting knife may also be adjusted inwardly, by screws 110 which pass through clearance holes 111 in the connecting rib 108 and are threaded in holes 112 in the knife 101. Furthermore, each shearing knife 101 so attached to a clamping block 102 is sloped forwardly at an angle to the radii of cylinder X located at its intersection with the surface of that cylinder, so that it will make along the trailing transverse edge of the signature S an inclined cut which, when the signature is laid flat, becomes a straight, square-cut edge.

During this transverse cutting operation the body of the signature is held firmly against the curved plate 71 forming the surface of the support member, so as to preclude shifting of the signature, by compressible elastic bearer means 114 and 161 carried on the cylinder X ahead of each of the knives 101. The forward portion 114 of each bearer means is a strip or surface member of rubber or other elastic material, which is vulcanized or otherwise bonded to an arcuate flange 115 to form a fixed portion of the peripheral surface of cylinder X. There are four such elastic bearer means, one adjacent to each of the knives 101, for coaction with four signature grippers and related support members on the central cylinder A. The flanges 115 mounting the members 114 are supported by ribs 116 extending radially from the central body 117 of the cylinder. The members 114 are formed with deep grooves or serrations 118 in their outer surface 119 in order to enhance their compressibility and flexibility and to provide a relatively large area of positive frictional contact between each member 114 and the related signature S.

A two-directional shearing motion at all times parallel to the axis of cylinder X is imparted to each of the knives 101 during each transverse cutting operation. For this purpose, a grooved stationary cam 120 mounted on the rear frame F—F (FIG. 4) guides follower rollers 121 which are rotatably mounted on the backward ends of levers 122 which in turn are pivotably supported through anti-friction bearings on stub shafts 125 protruding from the ribs 116 in a direction parallel to the axis of cylinder X. The forward end of each lever 122 is pivotally connected by anti-friction bearings and pin 129 to one end of a connecting block 130 which carries a trunnion pin 131 at its other end. The ends of each trunnion pin 131 are pivotally mounted by anti-friction bearings in one end of a double-ended yoke piece 133. The other end of each yoke piece 133 carries anti-friction bearings which serve as pivotal mountings for a second trunnion pin 135 which is securely fastened at its center to one end of a connecting block 136. The opposite end of each connecting block is connected by another pin 137 and anti-friction bearings to a forked pivot arm 139 rigidly secured by key 140 to one extension of an oscillating shaft 142 which is supported by anti-friction bearings in a housing 145 secured in one of the four radial ribs 116 of cylinder X. At the opposite side of the rib 116 the oscillating shaft 142 carries an eccentric link 147 which in turn carries a stud 148 pivotally supporting one end of one of the knife clamping blocks 102 through anti-friction bearings carried in a boss 151 on that end of the clamping block. An identical construction is provided at the opposite end of each clamping block 102, where a boss 151a carrying anti-friction bearings serves as a mounting for a stud 148a carried on the radially outward end of eccentric link 147a of oscillating idler shaft 142a.

The eccentric links of 147 and 147a thus form the driving and following links, respectively, of a parallelogram four-bar linkage, with clamping block 102 serving as the coupler link in this linkage. The motion of this linkage resulting from oscillation of the shaft 142, which occurs as the related follower roller 121 travels onto and from the hump of the grove cam 120 (FIG. 1), is always parallel to the axis of cylinder X.

The transverse shearing motion imparted to each of the knives 101 during its rotation and cutting action is a combination of motion parallel to the axis of rotation of cylinder X and inward withdrawal motion toward the center of that cylinder. The inward withdrawal motion is brought about by the linkage actuating the knife clamping block 102 and accompanies the rotary progression of the knife 101 and the anvil block 58 toward each other as they approach their meeting point at the line of tangency of the two cylinders A and X.

Figures 5, 6, 7, 8:
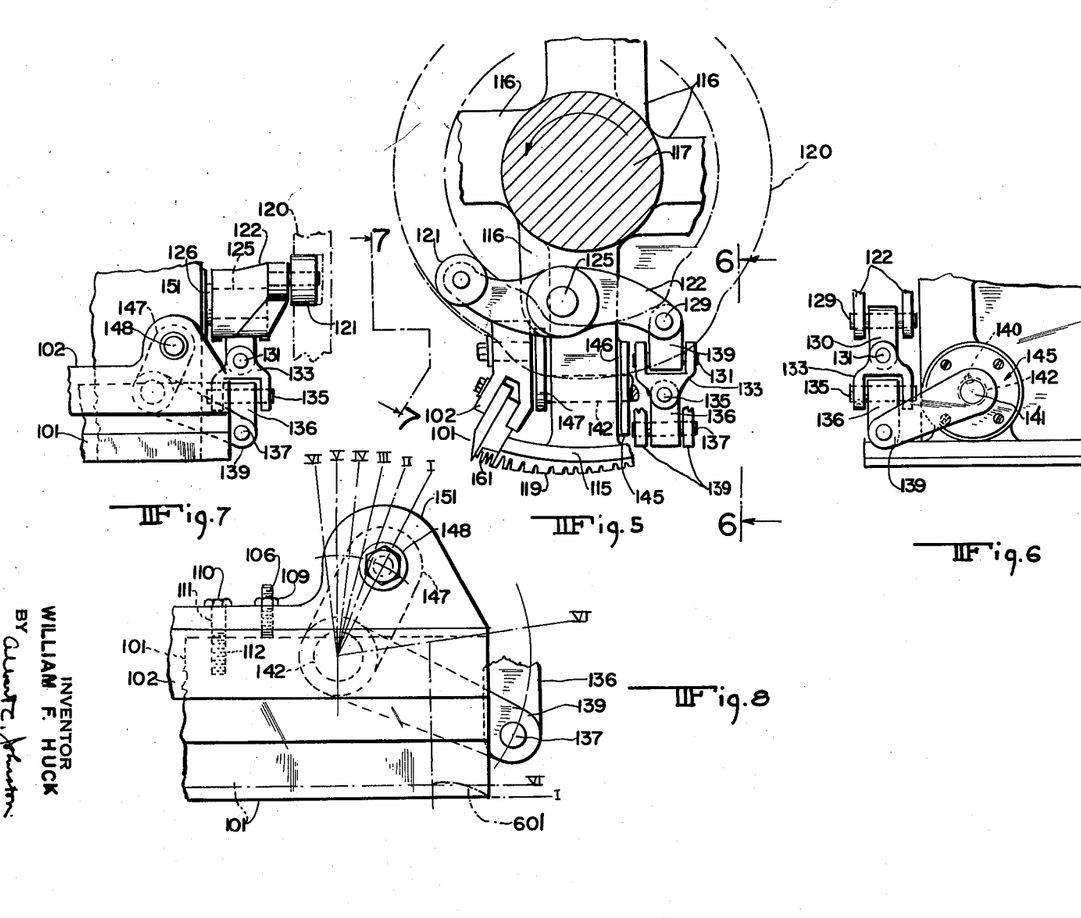
FIG. 5 is a fragmentary end elevational view of parts of the transverse cutting cylinder, as viewed from line 5—5 in FIG. 4.
FIG. 6 is a fragmentary side elevational view of parts of the same cylinder as viewed from line 6—6 in FIG. 5.
FIG. 7 is a fragmentary side elevational view of such parts, as viewed from line 7—7 in FIG. 5.
FIG. 8 is an enlarged view of a portion of the structure shown in FIG. 7.
Figure 9:
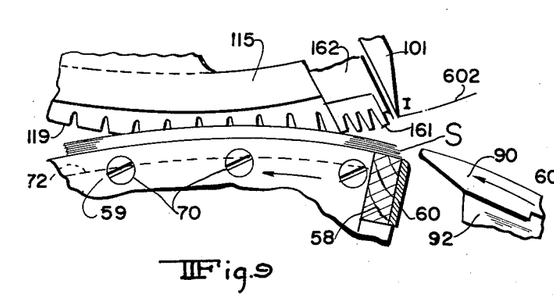
FIGS. 9 through 14 are schematic end views illustrating six successive positions in the operation of each shearing knife carried on the transverse cutting cylinder, in relation to a signature S carried on the central cylinder.
Figure 9A:
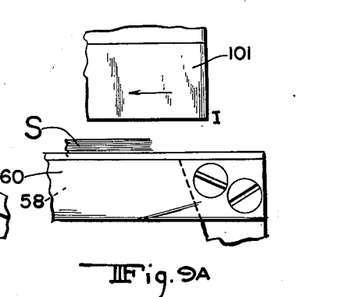
Figure 10:
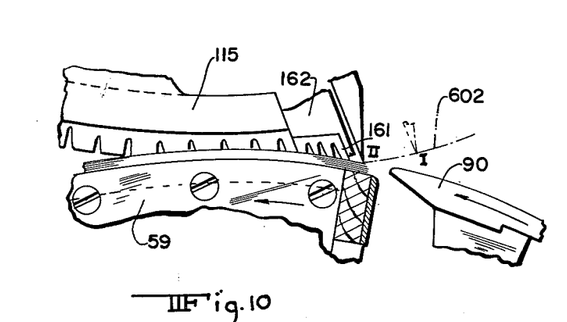
Figure 10A:
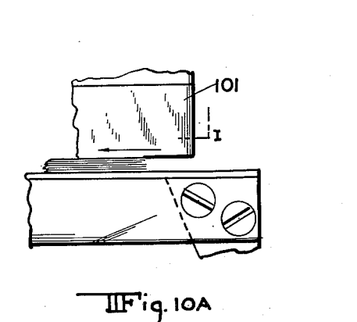
Figure 11:
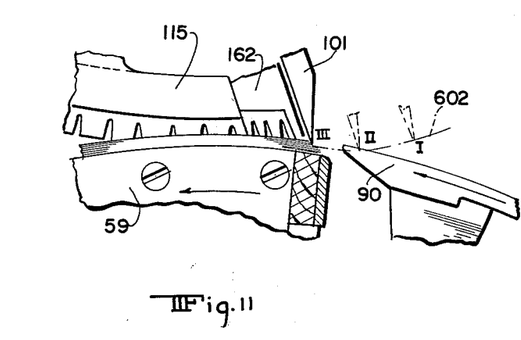
Figure 11A:
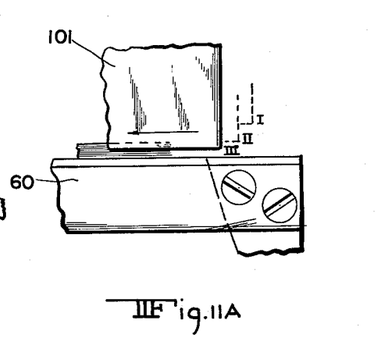
Figure 12:
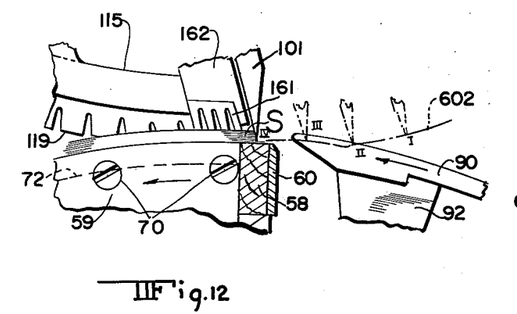
Figure 12A:
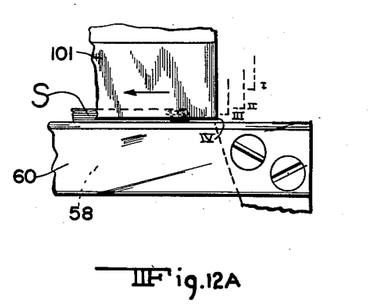
Figure 13:
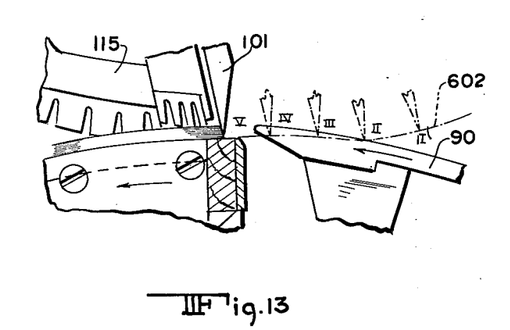
Figure 13A:
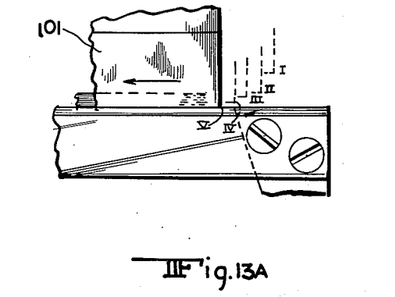
Figure 14:
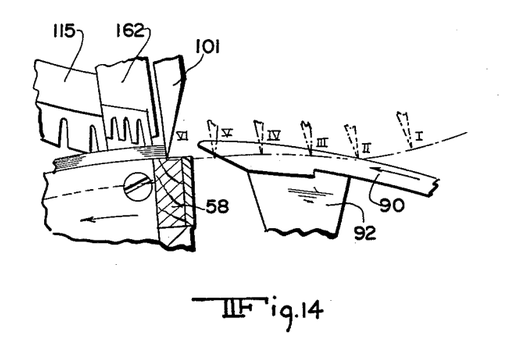
Figure 14A:
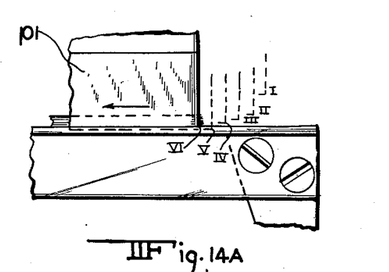

As indicated in FIG. 8, the eccentric links 147, 147a carry the studs 148, 148a attached to the clamping block 102 from position "I" to position "VI" during this transverse shearing motion. The mechanical linkage provided for producing this motion from radial displacements of each cam follower 121 is clearly illustrated in FIGS. 5, 6, 7 and 8. Six positions occurring successively in the action of each knife 101 are shown, respectively, in FIGS. 9 through 14, and from the front of the knife in FIG. 9A through 14A. These six positions correspond, respectively, to positions I through VI assumed by the pivot arm 139 and the eccentric link 147 for each knife 101, as shown diagrammatically in FIG. 8.

The path of the corner of each knife 101 is indicated by line 601 in FIG. 8. The path of the tip of the knife is indicated by line 602 in FIGS. 9 through 14.

A firm and relatively constant hold-down pressure is applied to that portion of the outer surface of each signature S in close proximity to a shearing knife 101, so as to prevent shifting thereof during the transverse cutting operation, by the backward portion 161 of the elastic bearer means ahead of the knife. That portion, too, is composed of rubber or other elastic material and is deeply grooved or serrated to enhance its compressibility and its frictional engagement with a trailing portion of the signature. Instead of being fixed in position, however, it is vulcanized or otherwise bonded to a slidable tongue bar 162 which contains horizontal slots 163 engaged by cam follower rollers 164 fastened by nuts 165 and lock-washers to a flange 167 projecting from clamping block 102.

Each tongue bar 162 thus is movable inwardly with the clamping block 102 and the related knife 101, through the rollers 164 in slot 163, but the tongue bar is contrained from moving axially with block 102 by roller guide 168 mounted on its opposite ends on the trailing end of the related cylinder flange 115. Therefore, the tongue bar 162 and the elastic bearer portion 161 thereon have an inward withdrawal motion toward the center of rotating cylinder X occurring simultaneously with the combined axial and withdrawal motion of the adjacent cutting knife 101.

The two side edges of each signature, S lying perpendicular to the axis of the carrier cylinder A, are cut by the interaction of cylinder A with a longitudinal cutting cylinder Y which carries four uniformly spaced pairs of arcuate shearing knives 201 lying in planes transverse to its axis. The cylinder Y is arranged adjacent to cylinder A at a location beyond the transverse cutting cylinder X and so that each set of the side cutting knives 201 will coact with the side anvil blocks 59 of one of the support members 50 so as to trim the side edges of a signature S after the trailing edge of the same signature has been trimmed by a knife 101 on cylinder X.

Each of the side cutting knives 201 is fastened to a clamping surface 202 on one end of the body 204 of cylinder Y, by means of screws 205 or the like which extend through slots 206 in the knife body so that the knife may be adjusted radially to fix its cutting edge 209 in the desired position relative to the coacting anvil block 59. The outward adjustment is accurately controlled by set screws 210 which are threaded through holes 211 in a flange 203 projecting from the end of cylinder body 204 and which bear against the base of the knife. The inward adjustment of the knife is accurately controlled by screws 213 which pass through clearance holes 214 in the same flange 203 and are threaded in holes 215 in the base of the knife 201.

The desired shear cutting action of the knives 201 is obtained by driving cylinder Y at a peripheral speed different from that of cylinder A. For example, a peripheral speed of the longitudinal side edge cutting cylinder approximately 30% less than the peripheral speed of the central cylinder has been used successfully. The extent of this speed differential of the side cutting cylinder is of course variable to conform with mechanical convenience or with qualities of particular sheet materials being trimmed. A peripheral speed of the knife edges 209 substantially less than the linear speed of the signatures being cut by those edges generally produces the desired shear cutting action.

The body of each signature S is maintained in firm face-to-face contact with the support member carrying it on the central cylinder A during the cutting action of a set of the knives 201 on the signature, so as to prevent shifting of the signature during the side cutting operation, by flexible means such as the hold-down belts 221. These are endless belts which pass around a roller 222 driving them at the peripheral speed of the central cylinder, and which also pass around idler roller 223 ahead of the zone of action of the knives 201. The lower flights of the belts are thus tensioned against the cylinder A in a portion of the path of the support members and signatures thereon, so that the body of each signature is held firmly against its supporting surface over its area lying between the cutting planes of the knives 201.

Upon being carried beyond the location of the belts 221, the signatures S, then in completely trimmed condition, are removed successively at their respective leading, folded edges from the central cylinder A by cam-actuated grippers G mounted on a delivery cylinder D, the construction of which is similar to that of the feeding cylinder T. The delivery cylinder grippers G are actuated by a stationary delivery cam 301 so as to close on the leading edges of the respective signature S simultaneously with the release of these signatures from the respective support surfaces of cylinder A, by the opening of the central cylinder grippers G through the action of the stationary cam 52.

The signatures are thus gripped to the delivery cylinder and successively carried by it away from the central cylinder to a suitable delivery point. As seen in FIG. 2, this point is near the lowest part of their path of rotating travel on cylinder D. At that point the respective delivery cylinder grippers G are opened by by stationary cam 301 so as to discharge the signatures successively onto a pile collector rack 401. Horizontal stripping bars 302, located at the surface of cylinder D between the grippers thereon, provide for positive removal of the signatures S from that surface. A vertical abutment plate 303 is supported below the stripping bars 302 in position to provide an accurately located stop for the moving signatures S as these are being deposited on pile P.

To prevent excessive rebounding of the signatures S off abutment plate 303, a trailing portion of each signature is retarded or slowed down by snubbing the signature between one of the two rollers 304 mounted on delivery cylinder D and a roller 305 rotating on a fixed axis adjacent to the surface of cylinder D. The rollers 304 are positively driven by a stationary gear 306 which is fastened to the inside of the rear machine frame F—F and which meshes with gears 308 fixed to extensions of the snubbing rollers 304 (FIG. 3). The snubbing rollers are rotatably mounted by anti-friction bearings 309 in flanges 310 of cylinder D.

The gear train 306, 308 is so proportioned that the relative peripheral rotating speed of each snubbing roller 304 is substantially less than that of cylinder D. The coacting snubbing roller 305 is rotated on a fixed axis by a gear 311 which is securely fastened to the extended journal 314 of delivery cylinder D and meshes with a gear 315 similarly mounted on the extended journal 316 of snubbing roller 305. This second gear train 311, 315 is so proportioned that the peripheral speed of snubbing roller 305 is equal to that of each snubbing roller 304 carried on cylinder D, and this speed, in turn, is substantially less than the travelling speed of the signatures S.

The rollers 304 and 305 thus exert a slow-down action against the trailing portion of each signature when the leading edge thereof is released from the delivery cylinder; and by suitable choice of the speed relationships, the signature is caused to fall down at a greatly retarded speed and in an orderly, controlled manner onto the pile collector rack 401, with little or no rebounding of the signatures off the abutment plate 393.

The trimmings cut from the three edges of the signtures S are removed from cylinder A by a vacuum exhaust system. In this system the trailing and side edge trimmings are removed inwardly through orifice-type openings 81 and 82, respectively, in the surface of cylinder A, which lead into internal channels 83 and 84, respectively, communicating with an axial cavity 85 in that cylinder. The cavity 85 extends through central cylinder hub 64 into a cylinder extension 86 which is connected through a rotary joint with the elbow 87 of a suction duct 88, for conducting away the trimmings by means of suction produced by a standard vacuum pump (not shown).

The openings 81 are formed adjacent to the trailing edges of the signatures S between the previously described clamping plates 60 and the forward edges 89 of rim plates 90 which are fastened to flanges 92 supported by spokes 93 extending outwardly from the central cylinder hub 64. The openings 82 are formed adjacent to the side edges of the signatures S between the previously described clamping plates 66 and the bent up ends 94 of cover plates 95 which are fastened to end rims 97 of the cylinder A. Those rims are supported by spokes 98 extending radially outward from the opposite tapered ends of the hub 64.

All the components of the apparatus hereinabove described may be driven in unison from a single rotary driving element directly coupled with the main driving shaft of a horizontal shaft 501 coupled with the printing press delivering the printed signatures S to this apparatus. For example, a horizontal shaft 501 coupled with the printing press drives a spur gear 505 through bevel gears 502 and 503 and a cross shaft 504 carrying gears 503 and 505 (FIG. 1). Gear 505 drives gear 506 (FIG. 4) fastened to the shaft extension 507 of transverse cutting cylinder X. Gear 506 in turn drives gear 41 fastened to the rear extension 42 of central cylinder A, which in turn drives gear 31 fastened to the rearward shaft extension 32 of feeding cylinder T, gear 321 fastened to the rearward shaft extension 314 of delivery cylinder D, and gear 231 fastened to the rear extension 232 of the roller 222 driving the hold-down belts 22. The shaft extension 42 of cylinder A also carries a second gear 43 which drves the gear 225 fastened to the rearward shaft extension 226 of the side cutting cylinder Y. The signature transport belts 11 and 12 are driven by pulleys coupled through suitable gearings with gear 31 of the feeding cylinder T. The entire gear drive just described is enclosed in a gear case C secured to the back side of the rear frame F—F.

While a perferred embodiment of this invention has been described and illustrated with reference to numerous particulars of its construction and operation, it is to be understood that the invention can be carried out in many other ways and that it is not intended to be limited to particulars of the illustrative embodiment except as may be required by fair construction of the appended claims.

I claim:

1. An apparatus for trimming pieces of sheeted material, which comprises a carrier having a surface adapted to support one of the pieces in face-to-face relation thereto, means on said carrier for holding said piece firmly to said surface, means for moving said carrier unidirectionally and cyclically through a path in which said surface is moved through a trimming zone, and means disposed opposite to said surface and moved with it in said zone for trimming said piece transversely with shear action, said trimming means including a second carrier carrying a transverse cutting knife having its cutting edge lying transverse to said path, and by which said knife is moved through said zone counter to and with said surface, and means operative as said knife is so moved to displace said knife bodily relative to said second carrier in a curved path lying within the plane of said knife.

2. An apparatus for trimming pieces of sheeted material, which comprises a carrier having a surface adapted to support one of the pieces in face-to-face relation thereto, means on said carrier for holding said piece firmly to said surface, means for moving said carrier unidirectionally and cyclically through a path in which said surface is moved through separate transverse and longitudinal trimming zones, means disposed opposite to said surface and moved with it in said transverse trimming zone for trimming said piece transversely with shear action, including a second carrier carrying a transverse cutting knife having its cutting edge lying transverse to said path, and by which said knife is moved through said zone counter to and with said surface, and means operative as said knife is so moved to displace said knife bodily relative to said second carrier in a curved path lying within the plane of said knife, and means disposed opposite to said surface in said longitudinal trimming zone for trimming said piece longitudinally with shear action, including another knife having a cutting edge lying in a fixed plane parallel to said path and means for moving said other knife relative to said surface so as to cut through said piece in a two-directional path lying within said fixed plane.

3. An apparatus for trimming pieces of sheeted flexible material, which comprises a carrier having a straight-convex surface adapted to support one of the pieces in face-to-face relation thereto, means on said carrier for holding said piece firmly to said surface, means for moving said carrier unidirectionally and cyclically through a path in which said surface is moved through a transverse trimming zone, and means disposed opposite to said surface and moved with it in said zone for trimming said piece transversely, said trimming means including a knife disposed opposite to and moved with and relative to said surface in a cutting plane lying transverse to said path but sloped from the knife edge forwardly in the direction of movement of said surface at an angle to the radii of said surface located at the intersection of said plane with said surface, whereby said knife cuts on said piece a tapered edge that becomes substantially square when the trimmed piece is laid flat.

4. An apparatus for trimming pieces of sheeted flexible material, which comprises a carrier having a straight-convex surface adapted to support one of the pieces in face-to-face relation thereto, means on said carrier for holding said piece firmly to said surface, means for moving said carrier unidirectionally and cyclically through a path in which said surface is moved through a transverse trimming zone, and means disposed opposite to said surface and moved with it in said zone for trimming said piece transversely, said trimming means including a knife disposed opposite to and moved with and relative to said surface in a cutting plane lying transverse to said path but sloped from the knife edge forwardly in the direction of movement of said surface at an angle to the radii of said surface located at the intersection of said plane with said surface, whereby said knife cuts on said piece a tapered edge that becomes substantially square when the trimmed piece is laid flat, said angle being approximately equal to the angle included by the curvature of said piece while said piece is held on said surface.

5. An apparatus for trimming pieces of sheeted material, which comprises a carrier having a straight-convex surface adapted to support one of the pieces in face-to-face relation thereto, means on said carrier for holding said piece firmly to said surface, means for moving said carrier unidirectionally and cyclically through a path in which said surface is moved through a trimming zone, and means disposed opposite to said surface and moved with it in said zone for trimming said piece transversely with shear action, said trimming means including a second carrier carrying a transverse cutting knife having its cutting edge lying transverse to said path, and by which said knife is moved through said zone counter to and with said surface, and means operative as said knife is so moved to displace said knife bodily relative to said second carrier in a curved path lying within the plane of said knife, said plane being sloped forwardly from the knife edge in the direction of movement of said surface at an angle to the radii of said surface located at the intersection of said plane with said surface, whereby said knife forms on said piece a tapered trimmed edge that becomes substantially square when the trimmed piece is laid flat.

6. An apparatus for trimming pieces of sheeted material, which comprises a carrier having a straight-convex surface adapted to support one of the pieces in face-to-face relation thereto, means on said carrier for holding said piece firmly to said surface, means for moving said carrier unidirectionally and cyclically through a path in which said surface is moved through separate transverse and longitudinal trimming zones, means disposed opposite to said surface and moved with it in said transverse trimming zone for trimming said piece transversely with shear action, including a second carrier carrying a transverse cutting knife having its cutting edge lying transverse to said path, and by which said knife is moved through said zone counter to and with said surface, and means operative as said knife is so moved to displace said knife bodily relative to said second carrier in a curved path lying within the plane of said knife, and means disposed opposite to said surface in said longitudinal trimming zone for trimming said piece longitudinally with shear action, including another knife having a cutting edge lying in a fixed plane parallel to said path and means for moving said other knife relative to said surface so as to cut through said piece in a two-directional path lying within said fixed plane, said transverse knife being sloped forwardly from its cutting edge in the direction of movement of said surface at an angle to the radii of said surface located at the intersection of the plane of said transverse knife with said surface, whereby said transverse knife forms on said piece a tapered trimmed edge that becomes substantially square when the trimmed piece is laid flat.

7. An apparatus for trimming pieces of sheeted material, comprising a rotary carrier having a cylindrically curved surface portion adapted to support a piece of said material in face-to-face relation thereto, means on said carrier for gripping said piece to said surface portion, means for rotating said carrier continuously through a fixed path in which said surface portion with said piece gripped thereto is carried through a transverse trimming zone, and means disposed opposite to said carrier in said zone and operative with shear action therein to trim said piece transversely with respect to the direction of its movement, said trimming means including a second rotary carrier carrying a knife having its cutting edge lying transverse to said direction, and by which said knife is moved through said zone counter to and in convergence with said surface portion, and means operative as said knife is so moved to displace said knife bodily relative to said second carrier in a two-directional path lying within the plane of the knife blade, through movement of said knife both in the direction of its cutting edge and toward the axis of said second carrier, whereby the knife cuts progressively through said piece with shear action during an extended period of convergence with said surface portion.

8. An apparatus for trimming pieces of flexible sheeted material, comprising a rotary carrier having mounted thereon at least one support member presenting a surface adapted to support a piece of said material in face-to-face relation thereto, means on said carrier for locating accurately on and gripping to said surface the leading edge of said piece, means for rotating said carrier continuously through a fixed path in which said surface is carried through a plurality of separate trimming zones spaced apart angularly about the periphery of said carrier, separate cutting means respectively operative in said trimming zones to trim the trailing edge of said piece transversely with respect to the direction of movement of said surface and to trim at least one side edge of said piece longitudinally, and separate means respectively operative transversely upon said piece throughout its respective movements through said trimming zones to hold the body of said piece firmly in smooth face-to-face relation to said surface during the respective actions of said cutting means, each of said cutting means including a knife operative with two-directional shear action within its cutting plane to trim said piece.

9. An apparatus as claimed in claim 8, said support member comprising anvil blocks composed of cut-resistant rigid material softer than and penetrable by said knives in positions to sustain the cuts of said knives.

10. An apparatus as claimed in claim 9, said anvil blocks being wooden blocks.

11. An apparatus for trimming pieces of sheeted material, comprising a carrier having mounted thereon at least one support member presenting a surface adapted to support one of said pieces in face-to-face relation thereto, means for moving said carrier repeatedly through a fixed path in spaced parts of which said surface is carried successively through a gripping zone, a plurality of separate trimming zones and a delivery zone, means for feeding said pieces successively into said gripping zone in coordination with the successive passes of said surface through said gripping zone, means on said carrier operative in each of said passes to grip one of said pieces to said surface, respective cutting means disposed opposite to said carrier and moved relatively to said surface in said trimming zones to trim the trailing and side edges respectively, of the piece gripped to said surface transversely and longitudinally with respect to the direction of movement of said surface, and means operative in said delivery zone to release and discharge said piece from said carrier, said support member having a free trailing edge and free side edges adjacent to the respective lines of action of said cutting means, said carrier having air passages formed therein which open adjacent to said free edges, and suction means for drawing the trimmings cut from said pieces through said passages to remove the trimmings from the apparatus.

12. A rotary trimmer for trimming pieces of flexible sheeted material, comprising a central cylinder rotatable about a fixed axis and a plurality of coacting cylinders, including a transverse cutting cylinder, spaced apart about said central cylinder and rotatable counter thereto on fixed axes; said central cylinder carrying a plurality of support members, each of which forms a cylindrically curved portion of its peripheral surface adapted to support a piece to be trimmed in face-to-face relation thereto, and means associated with each of said support members for gripping a leading edge of such piece thereto at a fixed location thereon in a first part of the path of said support members; said transverse cutting cylinder carrying a plurality of knives, each lying in a plane containing a generating line of the surface of that cylinder, in positions respectively to converge and coact with said support members in a further part of said path, and operating means connected with each said knife and actuated by the rotation of said transverse cutting cylinder as the knife is carried through the zone of its coaction with the related support member for moving the knife in a two-directional path in its plane so as cut transversely with shear action the piece gripped to said member.

13. A rotary trimmer as claimed in claim 12, each said operating means comprising a parallelogram linkage connected and rockable in a plane parallel to the related knife and a cam-operated system of pivoted arms and couplers movable by rotation of said cutting cylinder, to rock said linkage and thereby move said knife as aforesaid.

14. A rotary trimmer as claimed in claim 12, the plane of movement of each said knife in said zone being sloped at an angle to radii of the said generating line contained in said plane, so that the knife forms on said piece a tapered transverse edge which becomes substantially square when the trimmed piece is laid flat.

15. A rotary trimmer as claimed in claim 12, each said gripping means comprising a plurality of spaced arms mounted adjacent to the leading edge of the associated support member for movement about an axis parallel to the axis of said central cylinder, each of said arms carrying a resilient gripper at its end and being formed with an abutment beneath said gripper to position accurately the leading edge of a piece fed thereto.

16. A rotary trimmer as claimed in claim 12, and compressible elastic bearer means forming a cylindrically curved portion of the periphery of said transverse cutting cylinder ahead of each said knife and acting to press the body of said piece into smooth face-to-face contact with said support member progressively from a location near said leading edge to a location near the zone of the cutting action of said knife.

17. A rotary trimmer as claimed in claim 16, said bearer means comprising a forward elastic surface member mounted in a fixed location on said cutting cylinder and a backward elastic surface member lying next to said knife, and means for moving said backward member with said knife inwardly toward the axis of said cutting cylinder while constraining said backward member from movement with said knife in the direction parallel to said axis, whereby said backward member clamps to said support member the trailing portion of the piece adjacent to said knife while said knife is moved through its two-directional cutting path.

18. A rotary trimmer as claimed in claim 17, each of said surface members being composed of an elastic material and having grooves in its outer face rendering it easily compressible.

19. A rotary trimmer as claimed in claim 12, said support member comprising an anvil block of cut-resistant rigid material softer than and penetrable by said knife in position to sustain the cuts of said knife.

20. A rotary trimmer as claimed in claim 19, said anvil block being a wooden block forming a trailing end portion of said support member.

21. A rotary trimmer as claimed in claim 12, and means located along said path between said first part and said further part thereof for pressing against said surface of each said support member the body of each said piece gripped thereto, including a curved perforated panel mounted adjacent to said central cylinder and means for delivering air under pressure through the perforations of said panel against the outer surface of each said piece.

22. A rotary trimmer for trimming pieces of flexible sheeted material, comprising a central cylinder rotatable about a fixed axis and a plurality of coacting cylinders, including a transverse cutting cylinder and a longitudinal cutting cylinder, spaced about said central cylinder and rotatable counter thereto on fixed axes; said central cylinder carrying a plurality of support members, each of which forms a cylindrically curved portion of its peripheral surface adapted to support a piece to be trimmed in face-to-face relation thereto, and means associated with each of said support members for gripping a leading edge of such piece thereto at a fixed location thereon in a first part of the path of said support members; said transverse cutting cylinder carrying a plurality of knives, each lying in a plane containing a generating line of the surface of that cylinder, in positions respectively to converge and coact with said support members in a further part of said path, and operating means connected with each said knife and actuated by the rotation of said transverse cutting cylinder as the knife is carried through the zone of its coaction with the related support member for moving the knife bodily in a curved path in its plane while holding its cutting edge substantially parallel to its axis of rotation so as to cut transversely the piece gripped to said member; said longitudinal cutting cylinder carrying for each of said support members a pair of arcuate knives spaced apart axially thereon and each lying in a plane transverse to its axis in position to converge and coact with each said support member in another part of said path so as to trim the opposite side edges of each piece longitudinally, the cutting edge of each said arcuate knife being formed with a curvature greater than that of the related support members and being moved at a speed different from the peripheral speed of the central cylinder so that said arcuate knife edge undergoes combined longitudinal and radial motion relative to said piece to cut said piece with shear action.

23. A rotary trimmer as claimed in claim 22, and flexible means for pressing the body of said piece in said other part of said path into smooth face-to-face contact with said support member during the longitudinal cutting action, said flexible means comprising endless flexible belts having a flight thereof tensioned against a peripheral portion of said central cylinder between the latter and said longitudinal cutting cylinder.

24. A rotary trimmer as claimed in claim 22, said support member comprising an anvil block of cut-resistant rigid material softer than and penetrable by said knives in position to sustain the cuts of each said arcuate knife.

25. A rotary trimmer as claimed in claim 22, each of said support members comprising wooden anvil blocks forming opposite side portions thereof to sustain cuts of a pair of arcuate knives as aforesaid along the side edges of each said piece.

26. A rotary trimmer as claimed in claim 22, said central cylinder being formed with internal air passages which open through the periphery thereof along the trailing edge and along the side edges of each of said support members, and suction means connected with said passages for removing through them the trimmings cut from said pieces.

27. A rotary trimmer for trimming pieces of flexible sheeted material, comprising a central cylinder rotatable about a fixed axis and a plurality of coacting cylinders, including a feeding cylinder, a transverse cutting cylinder, a longitudinal cutting cylinder and a delivery cylinder, spaced apart about said central cylinder and rotatable counter thereto on fixed axes; said central cylinder carrying a plurality of support members, each of which forms a cylindrically curved portion of its peripheral surface adapted to support a piece to be trimmed in face-to-face relation thereto, and means associated with each said support member for gripping a leading edge of such piece thereto at a fixed location thereon in a first part of the path of said support members; said feeding cylinder comprising means for gripping said pieces successively thereto and being operative to carry and transfer each said piece gripped thereto to said gripping means associated with one of said support members in said first part of said path; said transverse cutting cylinder carrying a plurality of knives each lying in a plane containing a generating line of the surface of that cylinder, in positions respectively to converge and coact with said support members in a further part of said path, and operating means connected with each said knife and actuated by the rotation of said transverse cutting cylinder as the knife is carried through the zone of its coaction with the related support member for moving the knife bodily in a curved path in its plane while holding its cutting edge substantially parallel to its axis of rotation so as to transversely cut the piece gripped to said member; said longitudinal cutting cylinder carrying at least one arcuate knife in a plane transverse to its axis in position to converge and coact with each said support member in another part of said path so as to cut said piece longitudinally, the cutting edge of each said arcuate knife being formed with a curvature greater than that of said support members and being moved at a speed different from the speed of said support members so that said arcuate knife edge undergoes combined longitudinal and radial motion relative to said piece to cut said piece with shear action; said delivery cylinder comprising means operative in a final part of said path to grip the leading edge of each trimmed piece carried on said support member and discharge the trimmed piece away from said central cylinder; and a snubbing roller cooperating with roller means on said delivery cylinder to engage the body and retard the movement of trimmed pieces discharged by said delivery cylinder.

References Cited in the file of this patent

UNITED STATES PATENTS

| | | |
|---|---|---|
| 818,065 | Ward | Apr. 17, 1906 |
| 1,075,836 | Lorenz | Oct. 14, 1913 |
| 1,356,900 | Barber | Oct. 26, 1920 |
| 1,681,247 | Mulholland | Aug. 21, 1928 |
| 1,856,433 | Schillo | May 3, 1932 |
| 2,051,453 | Macaggart et al. | Aug. 18, 1936 |
| 2,065,327 | Grant et al. | Dec. 22, 1936 |
| 2,078,656 | Erickson | Apr. 27, 1937 |
| 2,693,236 | Kuts | Nov. 2, 1954 |
| 3,008,364 | Stobb | Nov. 14, 1961 |

UNITED STATES PATENT OFFICE
CERTIFICATE OF CORRECTION

Patent No. 3,165,954

January 19, 1965

William F. Huck

It is hereby certified that error appears in the above numbered patent requiring correction and that the said Letters Patent should read as corrected below.

Column 4, lines 1 and 2, strike out "lever 18 keyed to a shaft 19 mounted for rotation in the cylinder. Pivoting motion is imparted to each shaft 19" and insert the same before line 1 of column 5; column 7, line 9, for "grove" read -- groove --; column 9, line 67, for "drves" read -- drives --; column 12, lines 52 and 53, for "longitudinally" read -- longitudinally, respectively, --.

Signed and sealed this 3rd day of August 1965.

(SEAL)
Attest:

ERNEST W. SWIDER
Attesting Officer

EDWARD J. BRENNER
Commissioner of Patents